July 5, 1927.

S. L. B. LINES 1,634,546

MEANS FOR MEASURING THE FLOW OF ELECTRIC CURRENT IN A THREE-WIRE CIRCUIT

Filed Dec. 5, 1923

Inventor
Stanley L. B. Lines

Patented July 5, 1927.

1,634,546

UNITED STATES PATENT OFFICE.

STANLEY L. B. LINES, OF TORONTO, ONTARIO, CANADA, ASSIGNOR TO THE LINCOLN METER COMPANY LIMITED, OF TORONTO, ONTARIO, CANADA.

MEANS FOR MEASURING THE FLOW OF ELECTRIC CURRENT IN A THREE-WIRE CIRCUIT.

Application filed December 5, 1923. Serial No. 678,617.

The principal objects of this invention are to secure a true measurement of amperes of the total current flowing in a three wire circuit independent of any possible condition of unbalance of the load and to accomplish this result with a simple and effective device.

It is well known that many ammeters, particularly those used for the measurement of alternating currents, have a response in proportion to the square of the current flowing, that is to say, they have a scale of squares, and conversely if they have a scale of squares, the instrument to register correctly must have a response equal to the square of the sum of the currents in the outer mains. If therefore the indications of two meters that have a scale-of-square response are added together mechanically the sum of their indications is correct only when the two quantities so added are equal. All conditions of inequality, produce an error and the greater the inequality, the greater the error.

The invention herein disclosed produces the correct sum of the indications of two or more scale-of-square elements irrespective of of any inequality in the indications of the separate elements.

The principal feature of the invention consists in including in each of the outer line wires elements responsive to the flow of current therethrough and providing means to add them together and also providing a means responsive to the flow of current through the neutral wire and arranging same to subtract from the sum of the aforesaid currents in proportion.

Figure 1:
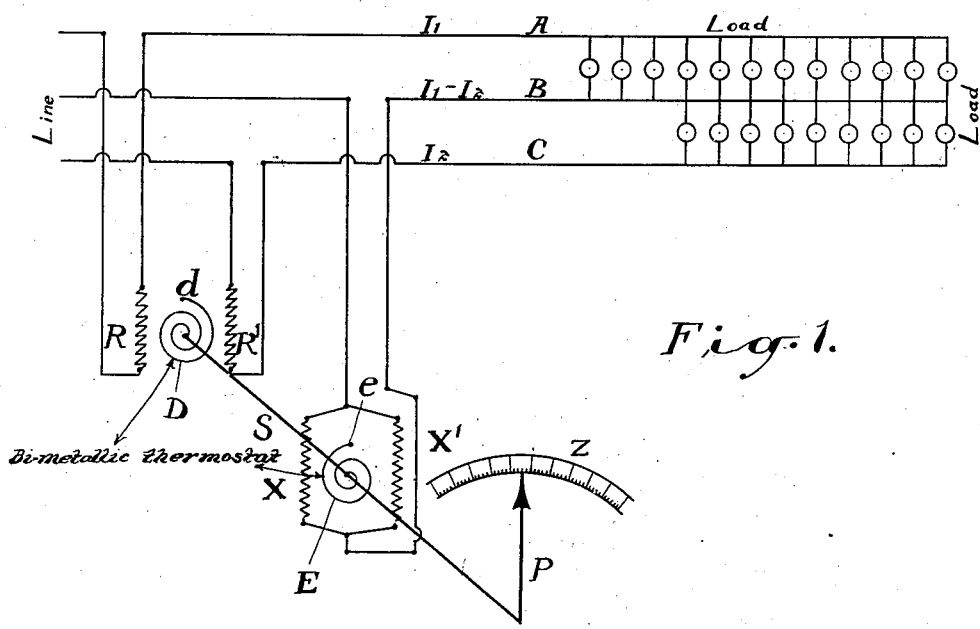

In the drawings, Figure 1 is a diagram illustrating the application of the invention in a type of meter wherein heat is developed by passing the current under measurement through resistances.

Figure 2:
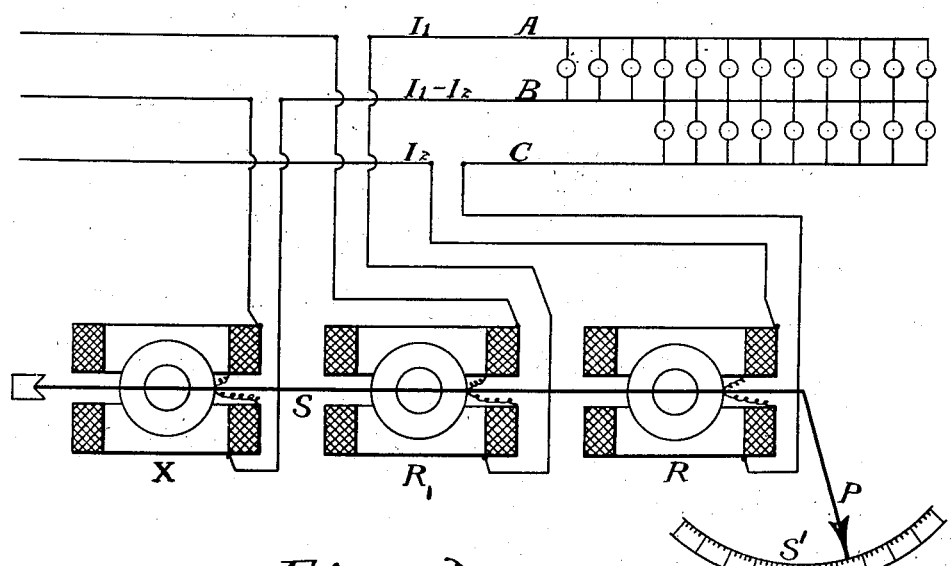

Figure 2 is a diagram illustrating the invention applied to the usual dynamometer type of ammeter.

On reference to the diagram illustrated in Figure 1, A and C represent the two outer mains and B the neutral wire of a three wire supply circuit.

Elements responsive to the flow of current are illustrated in Figure 1 in the form of resistances R and R' included in the mains A and C respectively and arranged adjacent to these resistances and subject equally to the heating influence of each is shown a heat actuated device in the form of a coiled bi-metallic spring strip D which is rigidly secured at the outer end $d$ and at the inner end is attached to a shaft S.

A pair of resistances X and X' are arranged in multiple and included in the neutral line B of the supply circuit.

A coiled bi-metallic spring strip E is arranged between the resistances X and X' and subject equally to the influence of each. The spring E is coiled in the opposite direction to the spring D and its outer end $e$ is rigidly secured while its inner end is secured to the shaft S.

A pointer P is secured to the shaft S and indicates on a suitable scale Z which is approximately a scale-of-squares.

It will be readily understood that the effect of the temperature as produced in the resistances R and R' will be cumulative in their influence upon the coil spring D and will represent the sum of the squares of the currents flowing through the line wires A and C. The resistances X and X' produce a temperature in proportion to the current flowing through the neutral line B and the temperature affects the coil E which operates in opposition to the coil D, thereby subtracting from the sum of the response to the flow of current passing through the outer line wires, the response to the flow of current passing through the neutral wire.

It is quite obvious that the degree of rotation of the shaft S will depend upon the difference of the temperature affecting the springs D and E and the pointer P will indicate that difference upon the scale Z.

In any three wire system the current in the neutral wire is the difference between the currents in the two outer wires. If then it is assumed that the currents $I_1$ and $I_2$ represent any degree of unbalance then the current in the neutral wire B is expressed in $I_1-I_2$. If it is assumed that the resistances R and R' and X and X' are equal in value, then the heat developed from the temperature obtained by the spring D is proportional $I_1^2 R + I_2^2 R'$. Under the influence of this heat the spring D tends to rotate the shaft S carrying the spring E with it and the amount of the rotation is measured by the indicator P on the scale Z.

As previously indicated if the heat developed by the resistance in the resistances R and R' affecting the spring D is depended upon, there will be an error in the registration of the sum of $I_1$ and $I_2$ unless these two quantities are equal.

In order to overcome this difficulty the neutral current is conducted through the resistance X and X' which affect the spring E. The resistances X and X' are shown arranged in parallel but this is not essential so long as the resistance through which the neutral current passes is half the value of each of the resistances through which the main current passes. The amount of the heat developed and therefore the temperature attained by the spring E is $$\frac{(I_1-I_2)^2 X}{2},$$

$\frac{X}{2}$ being the designation of the combined resistance of X and X'.

The heat affecting the spring E tends to rotate the shaft S is a direction oposite to the impulse of the spring D, therefore the torque causing the rotation is equal to the difference in the rotational effect between D and E. The rotational effect will therefore be:

$$I_1^2 R + I_2^2 R' - \frac{(I_1-I_2)^2 X}{2}$$

In other words the response of this type of meter will always be proportional to the square of the sum of the currents in the outer mains independent of the degree of unbalance.

In the diagram shown in Figure 2 the invention is illustrated as applied to the usual dynamometer form of ammeter. A and C are the outer mains and B the neutral of a three wire supply circuit. R and $R_1$ are dynamometer type ammeters whose windings are included in the line wires A and C respectively and X is a similar dynamometer connected to the neutral B.

It is a well known fact that such ammeters have a scale-of-squares response and these are mechanically connected by the shaft S operating a pointer P which indicates on the scale S'. The mechanical addition of the two separate indications of these ammeters will be correct only when the curents in R and $R_1$ are equal. In order to offset any inequality the neutral current is directed through the winding X which is attached to the shaft S and is so designed that one unit of current will produce half the torque that it does in R or $R_1$, also the torque produced will be in a direction opposite to that produced in R or $R_1$. The torque in the ammeter R will be proportional to $I_2^2$ and that in the ammeter $R_1$ to $I_1^2$ and that in X will be $\frac{1}{2}(I_1-I_2)^2$. The total torque will therefore be:

$$I_1^2 + I_2^2 - \tfrac{1}{2}(I_1-I_2)^2 = (I_1+I_2)^2 \tfrac{1}{2}.$$

In other words, the response is proportional to the square of the sum of the currents in the two outer leads which is the quantity needed in measurement for rate making purposes.

The present invention is centred upon a certain mathematical relation. If we have given the quantities $A^2$, $B^2$ and $(A-B)^2$ we can obtain the quantity $(A+B)^2$ from the mathematical relation $$A^2+B^2-\tfrac{1}{2}(A-B)^2=\tfrac{1}{2}(A+B)^2.$$

This mathematical relation may be applied in different ways, two forms being herein shown. In the form illustrated in Figure 2 a dynamometer type of meter is used and such a meter is not strictly a scale-of-squares meter since its response depends on the angle between the stationary and moving coils as well as the square of the current passing. This inaccuracy is overcome by providing the initial angle, between the stationary and moving coils, the same in all the dynamometers used. Then the departure from a true scale-of-squares response will be exactly the same for all the meters used, hence no error will be introduced in measuring the quantity $(A+B)^2$.

What I claim as my invention is:—

1. Means for measuring the flow of electric current in a three wire circuit, comprising a mechanically operated indicator, means responsive to the flow of the current passing through the outer line wires arranged to effect the operation of said indicator, and, means responsive to the flow of the current passing through the neutral wire, and adapted to oppose the operation of said indicator by the aforesaid means.

2. Means for measuring the flow of electric current in a three wire circuit, comprising means connected with each of the outer wires adapted to affect the addition of forces proportionate to the flow of current and to exert a proportional torque, a shaft connected with said means and adapted to be rotated thereby, means electrically connected with the neutral wire and operatively connected with said shaft and adapted to exert a torque to rotate said shaft in a direction opposed to the direction of rotation of the applied torque of the aforesaid means, the latter means applying a force equal to one-half the difference between the added forces applied to the first mentioned rotating means, and means attached to said shaft adapted to indicate the resultant rotation.

3. Means for measuring the flow of electric current in a three wire circuit, comprising, heater elements of equal resistance introduced in each of the line wires, a thermostatic member arranged relatively in the heating zone of said heaters, a heater element of half the resistance of either of the aforesaid heaters arranged in the neutral wire, a thermostatic member arranged in the heating zone of the latter heater and operatively opposed to the aforesaid thermostat, and means operatively connected with said thermostat for indicating the resultant force expressed by said thermostats.

4. Means for measuring the flow of electric current in a three wire circuit, comprising, heater elements of equal resistance introduced in each of the line wires, a coiled thermostatic member arranged between said heaters and equally affected thereby, a shaft connected to said coiled thermostat and rotated thereby, a heater element of half the resistance of either of the aforesaid heaters arranged in the neutral wire, a coiled thermostatic member arranged in the heating zone of the latter heater and operatively connected to said shaft to rotate same in opposition to the rotative effect of the aforesaid thermostat, an indicator connected to said shaft, and a scale of squares arranged in connection with said indicator.

5. Means for measuring the flow of electric current in a three wire circuit, comprising, a pair of heaters of equal resistance each arranged in one of the outer wires, a coiled bi-metallic spring arranged between said heaters and fixed at the outer end, a shaft connected to the inner end of said spring, a pair of heaters of half the resistance of either of the aforesaid heaters arranged in multiple in the neutral wire, a coiled bi-metallic spring arranged between the latter heaters and coiled in the opposite direction to the aforesaid spring and secured to said shaft and fixed at the outer end, an indicator on said shaft, and a scale of squares arranged in connection with said indicator.

STANLEY L. B. LINES.